Oct. 21, 1952     J. F. LUBZINSKI     2,614,439

SHIP'S STEERING WHEEL HUB

Filed Oct. 30, 1950

INVENTOR
JAMES F. LUBZINSKI

ATTORNEY

Patented Oct. 21, 1952

2,614,439

UNITED STATES PATENT OFFICE 2,614,439

SHIP'S STEERING WHEEL HUB

James F. Lubzinski, Steveston, British Columbia, Canada

Application October 30, 1950, Serial No. 192,859

2 Claims. (Cl. 74—552)

My invention relates to improvements in ships' steering wheel hubs.

The object of the invention is to provide a hub having spoke receiving sockets which are tapered in such a manner that a tensioning force is applied to the spokes between the said hub and the steering wheel rim. A further object is to provide a hub having tapered sockets which can be formed with all requisite accuracy without having to resort to machining the sockets.

Referring to the drawings.

In the drawings like characters of reference indicate corresponding parts in each figure.

Figure 1:
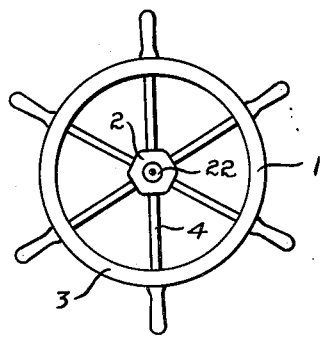
Figure 1 is an elevational view of a steering wheel fitted with the invention.
Figure 3:
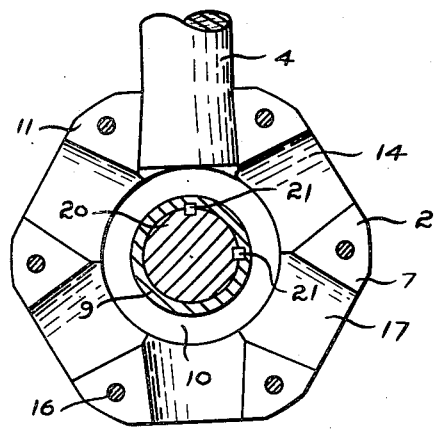
Figure 3 is a transverse sectional view taken on the line 3—3 of Figure 2.
Figure 2:
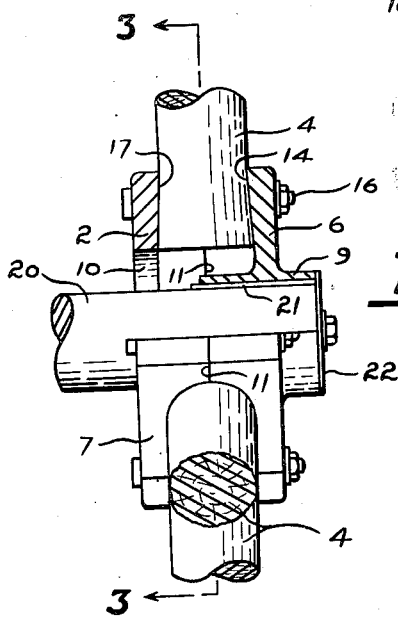
Figure 2 is a half sectional view of the hub showing the wheel spokes broken away.

The numeral 1 indicates a steering wheel of the marine type having a hub 2, a rim 3 and radial spokes 4. The hub 2 is substantially poligonal and is divided into front and rear portions 6 and 7. A shaft sleeve 9 is provided on the front portion 6 and the rear portion 7 has a centrally disposed opening 10. The inner contacting faces 11 of the portions 6 and 7 are each provided with complementary radially disposed semi-circular grooves 14, which grooves are tapered to a lesser diameter at their outer edges than at their inner edges. When the portions 6 and 7 are placed upon the ends of the spokes 4 and are secured together in face to face relation, as by means of nuts and bolts 16, the grooves 14 form tapered sockets 17 which tend to exert a force upon said spokes in the direction of the longitudinal axis of the hub. This tensioning of the spokes between the hub and the rim produces a steering wheel which possesses greater rigidity and strength than the conventional design and one in which normal shrinkage of the wood used cannot produce slack movement between any of its parts.

The hub 2 is adapted to be mounted upon a horizontal shaft 20 forming part of a ship's steering mechanism, not shown, which hub is non-rotatably secured thereto by one or more keys 21. A cap 22 is secured to the end of the shaft in the conventional manner.

What I claim as my invention is:

1. A hub for a ship's steering wheel having a rim and spokes connected thereto, said hub being divided transversely to form front and rear members, each of said members having complementary radially disposed frusto-conical recesses adapted to close upon mating inner ends of the spokes to retain said spokes against radially outward and swinging movement in the direction of rotation when said members are connected together.

2. In a ship's steering wheel, a hub having a plurality of circumferentially arranged sockets each having a frusto-conical inner end portion and a plurality of radially disposed spokes secured in said sockets, said sockets being of smaller diameter at the perimeter of the hub than adjacent its centre.

JAMES F. LUBZINSKI.

REFERENCES CITED

The following references are of record in the file of this patent:

UNITED STATES PATENTS

| Number | Name | Date |
|---|---|---|
| 258,834 | Whitehall et al. | May 30, 1882 |
| 433,105 | Starkey | July 29, 1890 |
| 597,346 | Wheeldon | Jan. 11, 1898 |
| 693,347 | Cullen | Feb. 11, 1902 |
| 1,510,278 | Hovey | Sept. 30, 1924 |